(12) United States Patent
Kashima (10) Patent No.: US 9,697,862 B2
(45) Date of Patent: Jul. 4, 2017

(54) DISK-SHAPED GLASS SUBSTRATE, MAGNETIC-DISK GLASS SUBSTRATE, METHOD FOR MANUFACTURING MAGNETIC-DISK GLASS SUBSTRATE, AND MAGNETIC DISK

(71) Applicant: Ryuichi Kashima, Kai (JP)

(72) Inventor: Ryuichi Kashima, Kai (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/894,859

(22) PCT Filed: Jun. 27, 2014

(86) PCT No.: PCT/JP2014/067134
§ 371 (c)(1),
(2) Date: Nov. 30, 2015

(87) PCT Pub. No.: WO2014/208717
PCT Pub. Date: Dec. 31, 2014

(65) Prior Publication Data
US 2016/0163344 A1 Jun. 9, 2016

(30) Foreign Application Priority Data
Jun. 27, 2013 (JP) .................. 2013-135380

(51) Int. Cl.
*G11B 5/73* (2006.01)
*G11B 5/82* (2006.01)
(Continued)

(52) U.S. Cl.
CPC ................ *G11B 5/82* (2013.01); *C03C 19/00* (2013.01); *G11B 5/73* (2013.01); *G11B 5/7315* (2013.01); *G11B 5/84* (2013.01); *G11B 5/8404* (2013.01)

(58) Field of Classification Search
None
See application file for complete search history.

(56) References Cited

U.S. PATENT DOCUMENTS

2006/0148386 A1* 7/2006 Ueda .................... G11B 5/8404
451/63
2009/0226767 A1* 9/2009 Fukushima .......... G11B 5/7315
428/848.2
(Continued)

FOREIGN PATENT DOCUMENTS

JP 2004-79009 A 3/2004
JP 2009-157968 A 7/2009
(Continued)

OTHER PUBLICATIONS

International Search Report in PCT/JP2014/067134 dated Sep. 9, 2014.

*Primary Examiner* — Kevin Bernatz
(74) *Attorney, Agent, or Firm* — Global IP Counselors, LLP (57) ABSTRACT

A disk-shaped glass substrate for a magnetic-disk glass substrate includes an outer circumference having a roundness of 1.3 μm or less. A first reference circle is obtained with a least squares method from a first outline corresponding to a shape of a lap around the outer circumference. A second reference circle is obtained with a least squares method from a second outline obtained by performing low-pass filtering using a period in which the number of peaks per lap is 150 as a cut-off value on the first outline. A ratio of the second peak count value defined by the number of peaks of the second outline that project outward in a radial direction from the second reference circle to the first peak count value defined by the number of peaks of the first
(Continued)

outline that project outward in a radial direction from the first reference circle is 0.2 or less.

20 Claims, 4 Drawing Sheets (51) Int. Cl.
*C03C 19/00* (2006.01)
*G11B 5/84* (2006.01)

(56) References Cited

U.S. PATENT DOCUMENTS

| 2010/0040907 | A1* | 2/2010 | Takizawa | G11B 5/82 |
| | | | | 428/826 |
| 2010/0285726 | A1* | 11/2010 | Ueda | B24B 5/04 |
| | | | | 451/41 |
| 2013/0089754 | A1* | 4/2013 | Nishimori | G11B 5/7315 |
| | | | | 428/846.9 |

FOREIGN PATENT DOCUMENTS

| JP | 2011-198429 A | 10/2011 |
| WO | 2009081565 A1 | 7/2009 |

* cited by examiner

DISK-SHAPED GLASS SUBSTRATE, MAGNETIC-DISK GLASS SUBSTRATE, METHOD FOR MANUFACTURING MAGNETIC-DISK GLASS SUBSTRATE, AND MAGNETIC DISK

CROSS-REFERENCE TO RELATED APPLICATIONS

This U.S. National stage application of International Patent Application No. PCT/JP2014/067134, filed on Jun. 27, 2014, which, in turn, claims priority under 35 U.S.C. §119(a) to Japanese Patent Application No. 2013-135380, filed in Japan on Jun. 27, 2013, the entire contents of which are hereby incorporated herein by reference.

BACKGROUND

Field of the Invention

The present invention relates to a disk-shaped glass substrate to be made into a magnetic-disk glass substrate, a magnetic-disk glass substrate, a method for manufacturing a magnetic-disk glass substrate, and a magnetic disk.

Background Information

Nowadays, personal computers, digital versatile disc (DVD) recorders, and the like have a built-in hard disk drive (HDD) for data recording. In particular, a magnetic disk in which a magnetic layer is provided on a glass substrate is used in a hard disk drive that is used in a device premised on portability, such as a notebook-type personal computer, and magnetic recording information is recorded on or read from the magnetic layer with a magnetic head that flies slightly above the surface of the magnetic disk. A glass substrate is unlikely to be plastically deformed compared with a metal substrate (aluminum substrate) and the like, and thus is preferably used as a substrate of the magnetic disk.

Moreover, the density of magnetic recording has been increased to meet the demand for an increase in the storage capacity of hard disk drives. For example, the magnetic recording information area (recording bit) has been made smaller using a perpendicular magnetic recording system that causes the direction of magnetization in the magnetic layer to be perpendicular to the surface of the substrate. This makes it possible to increase the storage capacity per disk substrate. Also, in order to further increase the storage capacity, the distance between the recording and reproducing element portion of the magnetic head and the magnetic recording layer is made very short by causing the element portion to project farther, thus further improving the accuracy of the recording and reproducing of information (improving the S/N ratio). It should be noted that such control of the recording and reproducing element portion of the magnetic head is called a dynamic flying height (DFH) control mechanism and a magnetic head equipped with this control mechanism is called a DFH head. A magnetic-disk glass substrate that is used in an HDD in combination with such a DFH head is produced so as to have an extremely smooth main surface in order to prevent the substrate from colliding or coming into contact with the magnetic head and the recording and reproducing element portion that projects farther therefrom.

Servo information to be used to position the magnetic head on a data track is recorded on the magnetic disk. It is conventionally known that when the roundness of an edge surface of the magnetic disk on the outer circumferential side (also referred to as "outer circumferential edge surface" hereinafter) is reduced, the magnetic head flies stably, the servo information is favorably read, and thus the magnetic head stably reads/writes information. For example, JP 2009-157968A states that in the technique described therein, processing is performed under two conditions for respectively forming two undulations having different wavelengths in a forming step of forming an edge portion on the outer circumferential side of a glass substrate. Accordingly, the undulations of the outer circumferential edge surface of the glass substrate can be eliminated to improve the roundness.

SUMMARY

It was found that when a magnetic disk is produced by forming a magnetic recording layer on a magnetic-disk glass substrate, extremely fine foreign matter constituted by glass components that is considered to be derived from the magnetic-disk glass substrate may adhere thereto. If a magnetic disk is manufactured in a state in which such foreign matter adheres to a magnetic-disk glass substrate, the foreign matter is likely to cause problems such as head crash and thermal asperity.

Therefore, an object of the present invention is to provide a disk-shaped glass substrate with which the occurrence of foreign matter constituted by glass components is suppressed in the process of manufacturing a magnetic-disk glass substrate, a magnetic-disk glass substrate, a method for manufacturing a magnetic-disk glass substrate, and a magnetic disk.

The inventors of the present invention intensively researched to find out the causes for the occurrence of extremely fine foreign matter constituted by glass components in the process of manufacturing a magnetic-disk glass substrate. As a result, dot-shaped or linear-shaped damage sometimes occurred over the entire circumference of the outer circumferential edge surface of the glass substrate, and it was inferred that the above-mentioned foreign matter occurred when the damage occurred. It should be noted that there were cases where the damage to the outer circumferential edge surface of the glass substrate was difficult to find even when the magnification of a laser microscope was set to be significantly large, and the damage was smaller than damage that was conventionally estimated.

More specifically, a cause of the occurrence is inferred as follows. When manufacturing a magnetic-disk glass substrate, main surface polishing processing is performed in which a pair of main surfaces of a disk-shaped glass substrate to be used to manufacture a magnetic-disk glass substrate (disk-shaped glass substrate to be made into a magnetic-disk glass substrate) are pressed against and polished with polishing pads in a state in which the glass substrate is held by a carrier. In this main surface polishing processing, since the diameter of the inner hole of the carrier is set to be slightly larger than the outer diameter of the glass substrate such that the carrier can easily accommodate the glass substrate, the glass substrate can move relative to the carrier inside the carrier during polishing. Therefore, the outer circumferential edge surface of the glass substrate is pressed against the edge surface of the inner hole of the carrier during polishing. It was thought that at this time, if deep unevenness exists in the outer circumferential edge surface of the glass substrate, raised portions of the unevenness are shaved off by being pressed against the edge surface of the inner hole of the carrier, thus causing damage to the outer circumferential edge surface of the glass substrate and the occurrence of fine foreign matter constituted by glass components. This cause of the occurrence is corroborated by the fact that in the glass substrate in which dot-shaped damage has occurred on the outer circumferential edge surface, the period of the observed dots substantially coincides with the period of the raised portions on the outline of the outer circumferential edge surface of the glass substrate that has been obtained before polishing.

It should be noted that the outer circumferential edge surface may also be damaged not only during the above-described main surface polishing processing but also when holding the outer circumferential edge surface of the magnetic-disk glass substrate during the formation of a layer on the magnetic-disk glass substrate. That is, it is also thought that if deep unevenness remains in the outer circumferential edge surface of the magnetic-disk glass substrate, when the outer circumferential edge surface of the glass substrate is held by a jig in order to form a layer, the raised portions of the outer circumferential edge surface are pressed against the jig and shaved off, and thus fine foreign matter constituted by glass components occurs.

The smaller the roundness of the outer circumferential edge surface of the glass substrate is, the lower the height of the unevenness of the outer circumferential edge surface tends to be, and therefore, it is thought that the above-mentioned damage is less likely to occur. However, as a result of intensive research by the inventors of the present invention, it was found that a plurality of glass substrates having the same roundness at the time before the main surface polishing processing sometimes differed from each other in the degree to which the damage to the outer circumferential edge surface of the glass substrate occurred after the main surface polishing processing was performed. Specifically, when the outer circumferential edge surfaces were observed after the main surface polishing processing in (a) glass substrates in which deep unevenness was formed over the entire circumference of the outer circumferential end portion before the main surface polishing processing, (b) glass substrates in which deep unevenness was formed in a portion of the outer circumferential end portion before the main surface polishing processing, and (c) glass substrates in which deep unevenness was not formed on the outer circumferential end portion before the main surface polishing processing and that had an elliptical shape as a whole, deep dot-shaped damage was observed only in the glass substrates of (a). Furthermore, since the measurement of the roundness is performed on an outline obtained by performing very strong low-pass filtering (e.g., low-pass filtering using a period in which the number of peaks per round is 50 as a cut-off value) on the above-mentioned outline, the roundness itself is not an index in which the number of raised and recessed portions and the depth of the unevenness of the raw outline of the glass substrate are properly reflected on measurement results. Therefore, it was thought that the degree of occurrence of the damage to the outer circumferential edge surface depends on not only the absolute value of roundness but also the properties of the outline of the outer circumferential edge surface.

In view of the foregoing problems, the inventors of the present invention devised roundness of the outer circumferential edge surface and properties of the outline of the outer circumferential edge surface before the main surface polishing processing with which damage to the disk-shaped glass substrate to be made into a magnetic-disk glass substrate is suppressed in the main surface polishing processing, allowing the present invention to be achieved.

A first aspect of the present invention is a disk-shaped glass substrate that includes a pair of main surfaces and is to be made into a magnetic-disk glass substrate. The outer circumference of the disk-shaped glass substrate has a roundness of 1.3 μm or less. Furthermore, a first reference circle is obtained with a least squares method from a first outline corresponding to a shape of a lap around the outer circumference of the disk-shaped glass substrate, and the number of peaks of the first outline that project outward in a radial direction from the first reference circle is defined as a first peak count value; a second reference circle is obtained with a least squares method from a second outline obtained by performing low-pass filtering using a period in which a number of peaks per lap is 150 as a cut-off value on the first outline, and the number of peaks of the second outline that project outward in a radial direction from the second reference circle is defined as a second peak count value; and a ratio of the second peak count value to the first peak count value is 0.2 or less.

It is preferable that a surface roughness of an outer circumferential edge surface is set such that an arithmetic mean roughness Ra is 0.02 μm or less.

The outer diameter of the disk-shaped glass substrate may be larger than that of a 2.5-inch magnetic-disk glass substrate.

A second aspect of the present invention is a magnetic-disk glass substrate in which an arithmetic mean roughness Ra of main surfaces is set to be 0.15 nm or less by polishing the main surfaces of the disk-shaped glass substrate.

A third aspect of the present invention is a magnetic-disk glass substrate including a pair of main surfaces, wherein the outer circumference of the glass substrate has a roundness of 1.3 μm or less. Furthermore, a first reference circle is obtained with a least squares method from a first outline corresponding to a shape of a lap around the outer circumference of the glass substrate, and the number of peaks of the first outline that project outward in a radial direction from the first reference circle is defined as a first peak count value; a second reference circle is obtained with a least squares method from a second outline obtained by performing low-pass filtering using a period in which a number of peaks per lap is 150 as a cut-off value on the first outline, and the number of peaks of the second outline that project outward in a radial direction from the second reference circle is defined as a second peak count value; and a ratio of the second peak count value to the first peak count value is 0.2 or less. In addition, an arithmetic mean roughness Ra of the main surfaces of the magnetic-disk glass substrate is 0.15 nm or less.

A fourth aspect of the present invention is a magnetic disk obtained by forming magnetic layers on the main surfaces of the magnetic-disk glass substrate.

A fifth aspect of the present invention is a method for manufacturing a magnetic-disk glass substrate including edge surface polishing processing for polishing an outer circumferential edge surface of a disk-shaped glass substrate using a polishing brush, and main surface polishing processing for polishing main surfaces of the glass substrate while the glass substrate with the polished outer circumferential edge surface is held with a carrier.

In the edge surface polishing processing, the outer circumferential edge surface is polished such that an outer circumference of the disk-shaped glass substrate has a roundness of 1.3 μm or less; a first reference circlet is obtained with a least squares method from a first outline corresponding to a shape of a lap around the outer circumference of the disk-shaped glass substrate, and the number of peaks of the first outline that project outward in a radial direction from the first reference circle is defined as a first peak count value; a second reference circle is obtained with a least squares method from a second outline obtained by performing low-pass filtering using a period in which a number of peaks per lap is 150 as a cut-off value on the first outline and the number of peaks of the second outline that project outward in a radial direction from the second reference circle is defined as a second peak count value; and a ratio of the second peak count value to the first peak count value is 0.2 or less.

With the disk-shaped glass substrate, the magnetic-disk glass substrate, and the method for manufacturing a magnetic-disk glass substrate described above, it is possible to suppress the occurrence of foreign matter constituted by glass components in the process of manufacturing a magnetic-disk glass substrate.

DESCRIPTION OF EMBODIMENTS

Hereinafter, a method for manufacturing a magnetic-disk glass substrate according to an embodiment of the present invention will be described in detail.

[Magnetic-Disk Glass Substrate]

Aluminosilicate glass, soda-lime glass, borosilicate glass, or the like can be used as a material for a magnetic-disk glass substrate of this embodiment. In particular, aluminosilicate glass can be preferably used because it can be chemically strengthened and used to produce a magnetic-disk glass substrate having excellent flatness of its main surfaces and excellent strength of the substrate.

Although there is no limitation on the composition of the glass material used in the magnetic-disk glass substrate of this embodiment, the glass substrate of this embodiment may preferably be amorphous aluminosilicate glass that has a composition including $SiO_2$, $Li_2O$, $Na_2O$, and one or more alkaline earth metal oxides selected from the group consisting of MgO, CaO, SrO and BaO as essential components, has a molar ratio of the content of CaO to the total content of MgO, CaO, SrO and BaO (CaO/(MgO+CaO+SrO+BaO)) of 0.20 or less, and has a glass-transition temperature of 650° C. or higher.

The glass substrate of this embodiment may also be crystallized glass that contains, in terms of oxide amount in mass %, $SiO_2$ in an amount of 45.60 to 60%, $Al_2O_3$ in an amount of 7 to 20%, $B_2O_3$ in an amount of 1.00 to less than 8%, $P_2O_5$ in an amount of 0.50 to 7%, $TiO_2$ in an amount of 1 to 15%, RO (it should be noted that R represents Zn and Mg) in a total amount of 5 to 35%, CaO in an amount of 3.00% or less, BaO in an amount of 4% or less, no PbO component, no $As_2O_3$ component, no $Sb_2O_3$ component, no component, no $^-$ component, no $SO^{2-}$ component, no $F^-$ component, and one or more selected from $RAl_2O_4$ and $R_2TiO_4$ (it should be noted that R represents one or more selected from Zn and Mg) as a main crystal phase, the particle size of crystals in the main crystal phase being in a range of 0.5 to 20 nm, the degree of crystallization being 15% or less, and the specific gravity being 2.95 or less.

Figure 1A:
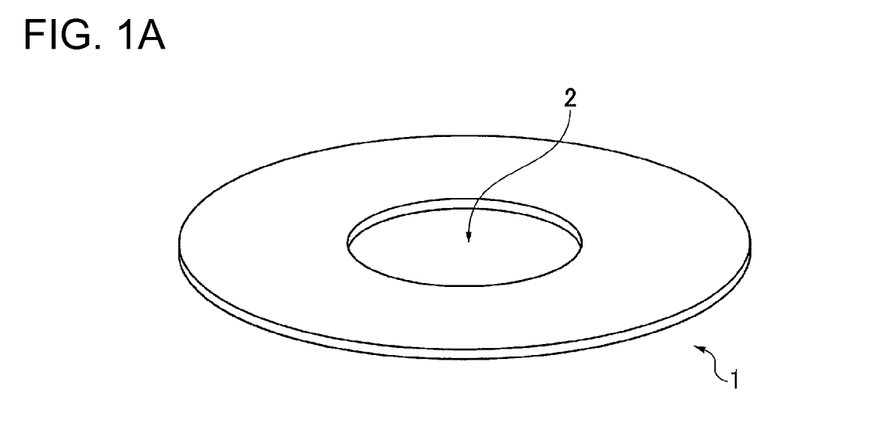
FIG. 1A is a diagram showing an external shape of a magnetic-disk glass substrate according to an embodiment.

FIG. 1A shows an external shape of the magnetic-disk glass substrate of this embodiment. As shown in FIG. 1A, a thin glass substrate that has a doughnut shape with an inner hole 2 formed therein is used as the magnetic-disk glass substrate of this embodiment. Although there is no limitation on the size of the magnetic-disk glass substrate, the magnetic-disk glass substrate is preferable for a magnetic-disk glass substrate having a nominal diameter of 2.5 inches, for example.

Figure 1B:
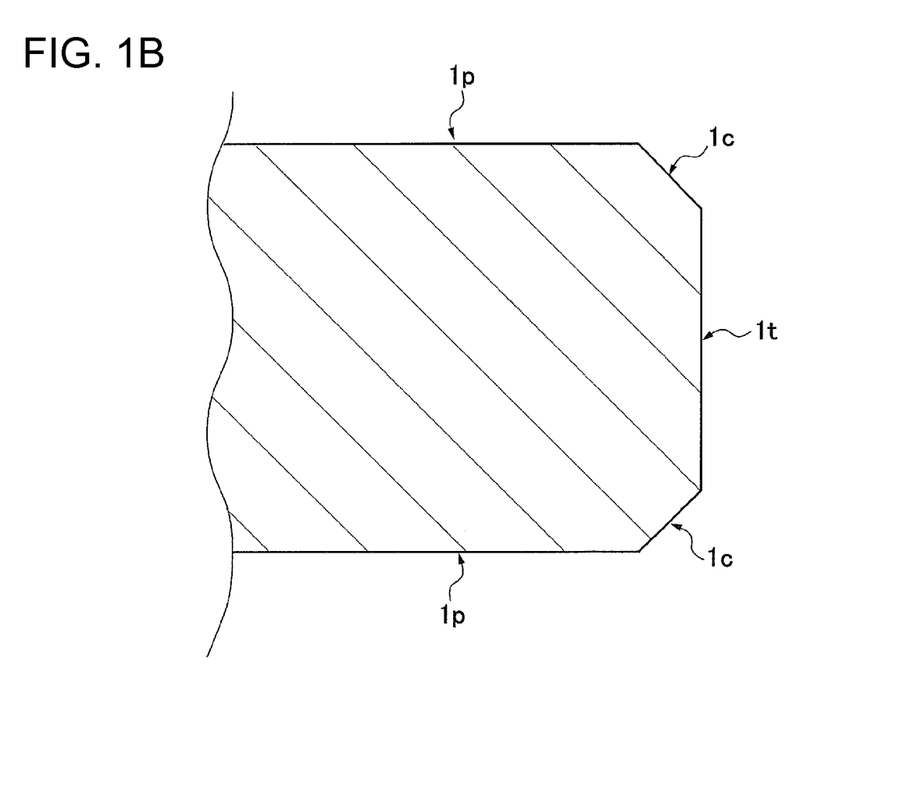
FIG. 1B is an enlarged cross-sectional view of an edge portion on the outer circumferential side of the magnetic-disk glass substrate according to the embodiment.

FIG. 1B is an enlarged cross-sectional view of an edge portion on the outer circumferential side of the magnetic-disk glass substrate of this embodiment. As shown in FIG. 1B, the magnetic-disk glass substrate includes a pair of main surfaces $1p$, a side wall surface $1t$ that is disposed in a direction orthogonal to the pair of main surfaces $1p$, and a pair of chamfered surfaces $1c$ that are disposed between the pair of main surfaces $1p$ and the side wall surface $1t$. A side wall surface and chamfered surfaces, which are not shown in the drawings, are also formed in the edge portion on the inner circumferential side of the magnetic-disk glass substrate. An angle (chamfering angle) of each chamfered surface $1c$ with respect to the side wall surface $1t$ is 40 to 50°, for example, and typically 45°. It should be noted that the chamfered surfaces may be formed in an arc shape when viewed in cross section.

[Method for Manufacturing Magnetic-Disk Glass Substrate]

Hereinafter, a method for manufacturing a magnetic-disk glass substrate of this embodiment will be described for each series of processing. It should be noted that the processing order may be changed as appropriate.

(1) Plate Glass Molding and Rough Grinding Processing

After forming a sheet of plate glass by a float method, for example, a raw glass plate having a predetermined shape from which a magnetic-disk glass substrate is to be made is cut out from this sheet of plate glass. A raw glass plate may also be molded by press molding using an upper mold and a lower mold instead of a float method, for example. It should be noted that a method for manufacturing a raw glass plate is not limited to these methods and a raw glass plate can also be manufactured by a known manufacturing method such as a down draw method, a redraw method or a fusion method.

It should be noted that rough grinding processing may be performed on the two main surfaces of the raw glass plate as needed.

(2) Shaping Processing

Next, shaping processing is performed. In the shaping processing, a circular hole is formed using a known processing method after molding a glass blank, and thus a disk-shaped glass substrate provided with a circular hole is obtained. Thereafter, the edge surface of the glass substrate is chamfered using a formed grindstone, for example. Accordingly, the side wall surface, which is orthogonal to the main surfaces, and the chamfered surfaces, which connect the side wall surface and the main surfaces, are formed on the edge surface of the glass substrate.

(3) Edge Surface Polishing Processing

Next, edge surface polishing processing is performed on the glass substrate. The edge surface polishing processing is processing for performing polishing by supplying a polishing liquid that contains loose abrasive particles between a polishing brush and the edge surface of the glass substrate and moving the polishing brush and the glass substrate relative to each other. In the edge surface polishing, the inner circumferential side edge surface and the outer circumferential side edge surface of the glass substrate are polished and are brought into a mirror-surface state. At this time, a polishing liquid containing microparticles of cerium oxide or the like as the loose abrasive particles is used, for example. By performing the edge surface polishing, contamination by adhered particles of foreign matter such as dust, and impairment such as damage or scratches can be eliminated from the edge surfaces of the glass substrate. This makes it possible to prevent thermal asperity even if this glass substrate is used to manufacture a magnetic disk. It is preferable that the side wall surfaces and/or the chamfered surfaces, which have undergone the edge surface polishing, have a surface roughness of 0.02 μm or less at arithmetic mean roughness Ra. Furthermore, it is more preferable that the surface roughness is 0.3 μm or less at maximum valley depth Rv. When the Ra and Rv are set to be in such ranges, it is possible to reduce damage due to contact between the outer circumferential edge surface of the glass substrate and a carrier in polishing processing, which will be described later. It should be noted that this reduces damage to the carrier, thus making it possible to increase the use of the carrier.

The glass substrate of this embodiment, which has undergone the edge surface polishing, has the following properties.

(A) The outer circumferential edge surface has a roundness of 1.3 μm or less.

(B) A raw (i.e., non-filtered) first outline and a second outline that has undergone low-pass filtering using a period in which the number of peaks per lap is 150 as a cut-off value (referred to as "150 peaks/rotation low-pass filtering" hereinafter) are obtained as an outline in a circumferential direction of the outer circumferential edge surface, and a ratio of a peak count value of the second outline (second peak count value) to a peak count value of the first outline (first peak count value) is 0.2 or less. The peak count value is a value obtained by counting the number of peaks per lap around an outline. More specifically, a reference circle (perfect circle) is obtained with a least squares method from data of the outline of the outer circumferential edge surface, and the number of peaks of the outline that are larger than the reference circle (that is, peaks projecting outward in the radial direction) is defined as the peak count. It should be noted that a portion of the outline between a position that is larger than the reference circle and a position that is smaller than the reference circle is counted as one peak.

Figure 2:
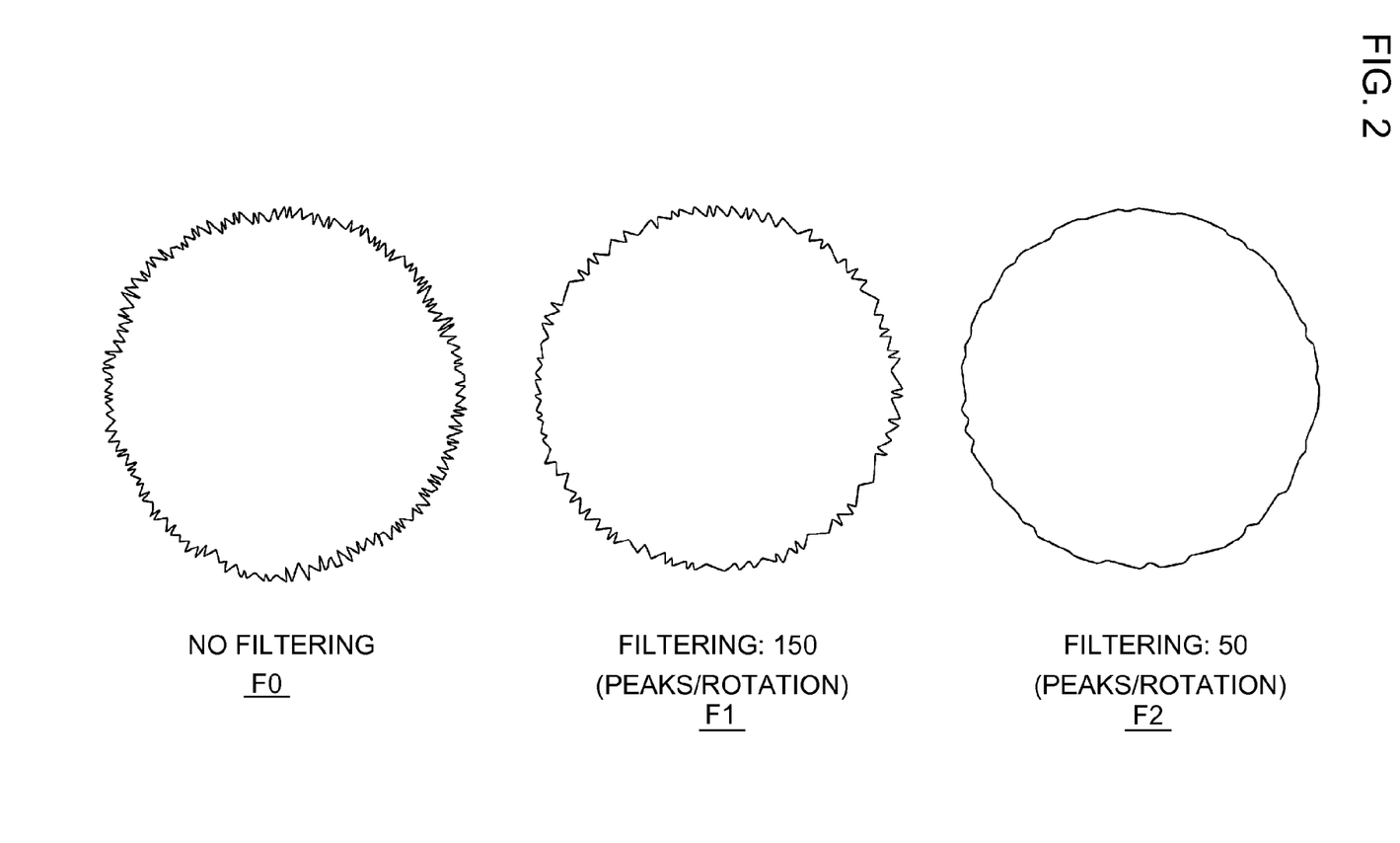
FIG. 2 shows examples of an outline of the outer circumferential edge surface of the glass substrate based on set values of filtering.

FIG. 2 shows diagrams for illustrating the difference in filtered outlines when performing filtering on the raw outline of the outer circumferential edge surface of the glass substrate, which has undergone the edge surface polishing. In FIG. 2, F0 shows a raw outline (an example of the first outline), F1 shows an outline obtained by performing the 150 peaks/rotation low-pass filtering on the raw outline (an example of the second outline), and F2 shows an outline obtained by performing the 50 peaks/rotation low-pass filtering (low-pass filtering using a period in which the number of peaks per lap is 50 as a cut-off value) on the raw outline, respectively. It is found from FIG. 2 that the stronger the filtering property is, the smoother the unevenness of the outline becomes, and the number of peaks (peak count) decreases.

The roundness of the outer circumferential edge surface is calculated based on the outline of F2, which has undergone the 50 peaks/rotation low-pass filtering.

In the main surface polishing processing, which will be described later, the glass substrate and the carrier are moved relative to each other in a state in which the carrier accommodates the glass substrate. Therefore, if the outer circumferential edge surface of the glass substrate, which has undergone the edge surface polishing, has surface properties including a large amount of deep unevenness, the raised portions of this unevenness are pressed against the inner edge surface of the carrier and shaved off, and thus the glass substrate is damaged and fine foreign matter constituted by glass components occurs. As a result of intensive research by the inventors of the present invention, it was found that when the outer circumferential edge surface satisfies the above-mentioned properties (A) and (B), the occurrence of damage and the occurrence of foreign matter described above can be suppressed.

First, since favorable roundness as shown in (A) results in a decrease in the height of undulation having a relatively large wavelength, the outer circumferential edge surface of the glass substrate is likely to be pressed against the inner edge surface of the carrier by surface contact, thus suppressing damage to each of the raised and recessed portions of the outer circumferential edge surface.

Second, when the above-mentioned peak count value of the first outline (first peak count value) is referred to as PC1, the above-mentioned peak count value of the second outline (second peak count value) is referred to as PC2, and PC2/PC1 (referred to as "peak count ratio" hereinafter) is set to be 0.2 or less, damage to each of the raised and recessed portions of the outer circumferential edge surface is further suppressed. The following is the reason for this. It is thought that this peak count ratio is correlated with the number of deep raised and recessed portions of the raw outline, and in turn the number of sites at which damage to the outer circumferential edge surface of the glass substrate occurs. That is, if the outer circumferential edge surface is significantly damaged, or in other words, if there is a large number of deep raised and recessed portions of the raw outline, a large number of peaks remain on the outline even if the relatively strong 150 peaks/rotation filtering is performed, and thus the peak count ratio increases. On the other hand, if there is a small number of sites at which damage to the outer circumferential edge surface occurs, or in other words, if there is a small number of deep raised and recessed portions of the raw outline, a small number of peaks remain on the outline when the relatively strong 150 peaks/rotation filtering is performed, and thus the peak count ratio decreases. Therefore, when the property shown in (B) is satisfied, it is possible to suppress damage to the outer circumferential edge surface.

It should be noted that according to research by the inventors of the present invention, when an outline that had undergone the 50 peaks/rotation low pass filtering was used as the above-mentioned second outline instead of an outline that had undergone the 150 peaks/rotation low pass filtering, it was confirmed that damage to the outer circumferential edge surface did not significantly change depending on the magnitude of the peak count ratio. It is thought that this is because the 50 peaks/rotation filtering is excessively strong, and the peak counts of the outlines, which have undergone the 50 peaks/rotation filtering, of the glass substrates are not significantly different from each other.

Figure 3A:
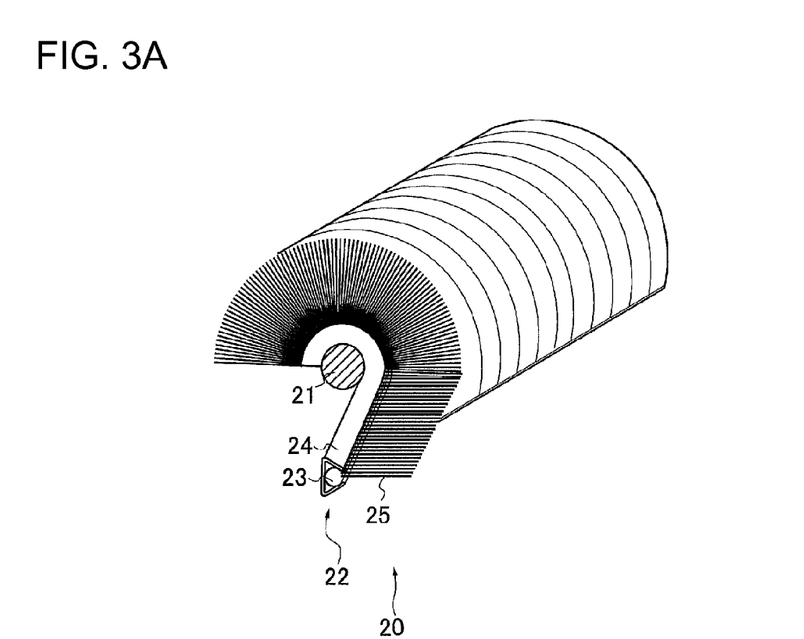
FIG. 3A is a diagram for illustrating a structure of a polishing brush of an embodiment.
Figure 3B:
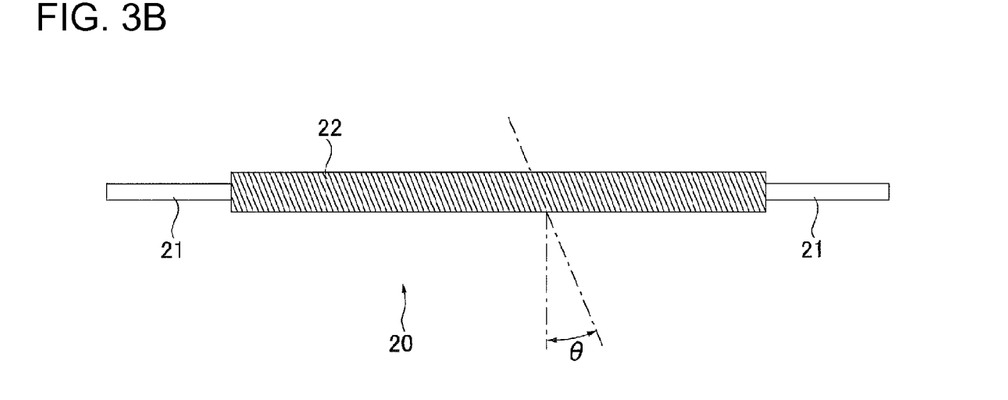
FIG. 3B is a diagram for illustrating the structure of the polishing brush of the embodiment.
Figure 4:
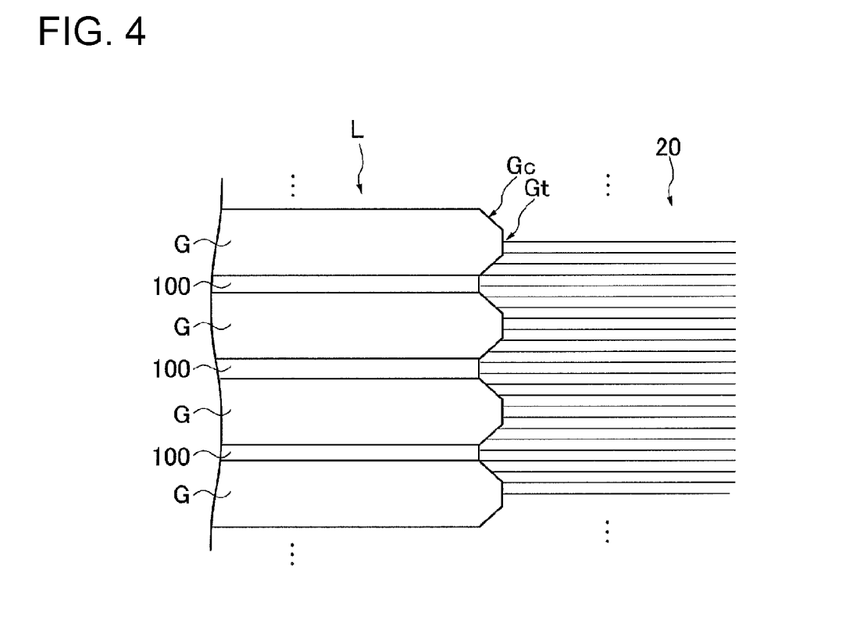
FIG. 4 is a diagram showing edge surface polishing processing performed on the outer circumferential edge surface using the polishing brush in an embodiment.

Hereinafter, an edge surface polishing method for polishing the outer circumferential edge surface will be described with reference to FIGS. 3A, 3B and 4. FIGS. 3A and 3B are diagrams for illustrating a structure of a polishing brush to be used in the edge surface polishing. FIG. 3A is a perspective view of a polishing brush 20 in which a channel brush (brush line) is wound around a shaft. FIG. 3B is a side view of the polishing brush. FIG. 4 is a diagram showing edge surface polishing processing performed on the outer circumferential edge surface using the polishing brush.

As shown in FIGS. 3A and 3B, the polishing brush 20 is a channel roll brush formed by winding a channel brush 22 in a spiral around a shaft 21 at a predetermined interval and a predetermined lead angle $\theta$ and fixing it thereto. Bristle materials 25 of the channel brush 22 are fixed to a core wire 23 inside a base fitting 24 and extend toward the bristle ends through an open end of the base fitting 24. That is, in a state in which the channel brush 22 is wound around the shaft 21, the bristle materials 25 are implanted such that their bristle ends extend radially with respect to the shaft 21. When the lead angle $\theta$ increases, the interval of the wound channel brush may become large. In such a case, it is preferable to wind a plurality of channel brushes in parallel. The bristle material 25 is made of synthetic polyamide fiber, polybutylene terephthalate (PBT), polypropylene (PP), nylon, or the like, for example. It is preferable to set the wire diameter of the bristle material 25 to be 0.05 to 0.5 mm from the viewpoint of the surface roughness after polishing and the polishing rate, and a wire diameter of 0.03 mm or more is more preferable because the rigidity of the bristle material increases, and the peak count of the above-mentioned outline of the outer circumferential edge surface is likely to decrease. Moreover, the length of the bristle material 25 can be set to be 1 to 30 mm, but a length of 10 mm or less, or furthermore, a length of 5 mm or less is preferable in order to increase the rigidity. It is also preferable to divide the pressure with which the brush is pressed against the edge surface of the glass substrate into multiple stages and perform final polishing at the lowest pressure in the last stage. In this application, brushing is performed with the above-mentioned parameters being adjusted and combined as appropriate.

FIG. 4 shows an example in which a laminated workpiece L including a plurality of glass substrates serving as workpieces is polished using the polishing brush 20 to simultaneously polish the outer circumferential edge surfaces (side wall surfaces Gt and the chamfered surfaces Ge) of the plurality of glass substrates. It should be noted that FIG. 4 is merely an example, and polishing may be performed individually on the outer circumferential edge surface of a single glass substrate.

In the laminated workpiece L in FIG. 4, spacers 100 are inserted between adjacent glass substrates G. Accordingly, the bristle ends of the polishing brush enter the chamfered surfaces Gc of the glass substrates G, thus making it possible to sufficiently polish the chamfered surfaces Gc. Although there is no limitation on the material of the spacers 100, thin spacers can be used that are made of a resin material, fiber material, rubber material, metal material, or ceramic material, for example.

It should be noted that in a case where the polishing brush is used to polish a laminated workpiece, if the bristle materials of the polishing brush are thick, it may be difficult to polish the chamfered surfaces Gc. In such a case, it is sufficient to separately perform processing for polishing the chamfered surfaces Gc.

When the lead angle $\theta$ of the polishing brush 20 shown in FIG. 3 is set to be 45° or more, and the pressure with which the polishing brush 20 is pressed against the outer circumferential edge surface of the glass substrate is adjusted as appropriate, a glass substrate that satisfies the above-mentioned properties (A) and (B) can be produced.

(4) Precision Grinding Processing

In precision grinding processing, the main surfaces of the disk-shaped glass substrate are ground using a double-side grinding device provided with a planetary gear mechanism. The double-side grinding device has a pair of upper and lower surface plates (upper surface plate and lower surface plate), and the disk-shaped glass substrate mounted to the carrier is held between the upper surface plate and the lower surface plate. A coolant is supplied between the glass substrate and the surface plates, and the glass substrate and the surface plates are moved relative to each other by moving one or both of the upper surface plate and the lower surface plate, thus making it possible to grind the two main surfaces of the glass substrate. Surface plates to which fixed abrasive particles made of diamond are attached can be used as the surface plates.

(5) First Polishing (Main Surface Polishing) Processing

Next, first polishing processing is performed on the main surfaces of the glass substrate. Specifically, the main surfaces on the two sides of the glass substrate are polished while the outer circumferential side edge surface of the glass substrate is held in a holding hole provided in a holding member (carrier) of a double-side polishing device that has a configuration similar to that of the above-described double-side grinding device. In the first polishing processing, polishing pads and a polishing liquid including loose abrasive particles are used. Although there is no limitation on the loose abrasive particles to be used in the first polishing, cerium oxide abrasive particles, zirconia abrasive particles, or the like are used, for example. It is preferable to set the average particle diameter (D50) of the abrasive particles to be 0.1 to 5 µm. Although there is no particular limitation on the type of polishing pad, a resin polisher made of urethane foam is used, for example. In this case, it is preferable to set the hardness of the polishing pad to be in a range of 60 to 90 in Asker C hardness.

In the first polishing processing, a polishing liquid is supplied between the main surfaces of the glass substrate and the polishing pads, and the glass substrate and the polishing pads are moved relative to each other, thus polishing the glass substrate. At this time, as shown in FIG. 5, a circular carrier 30 of the double-side polishing device provided with a planetary gear mechanism accommodates the glass substrate G.

Since a diameter D2 of the inner hole of the carrier 30 is set to be slightly larger than an outer diameter D1 of the glass substrate in order that the carrier 30 easily accommodates the glass substrate G, the glass substrate G can be moved relative to the carrier 30 inside the carrier 30 during polishing. Therefore, the outer circumferential edge surface (side wall surface Gt) of the glass substrate G is pressed against the edge surface of the inner hole of the carrier 30 during the main surface polishing. At this time, in the case where deep unevenness exists on the outer circumferential edge surface of the glass substrate G, there is a concern that the raised portions will be pressed against the edge surface of the inner hole of the carrier 30 and shaved off, resulting in damage to the outer circumferential edge surface of the glass substrate G and the occurrence of fine foreign matter constituted by glass components.

Figure 5:
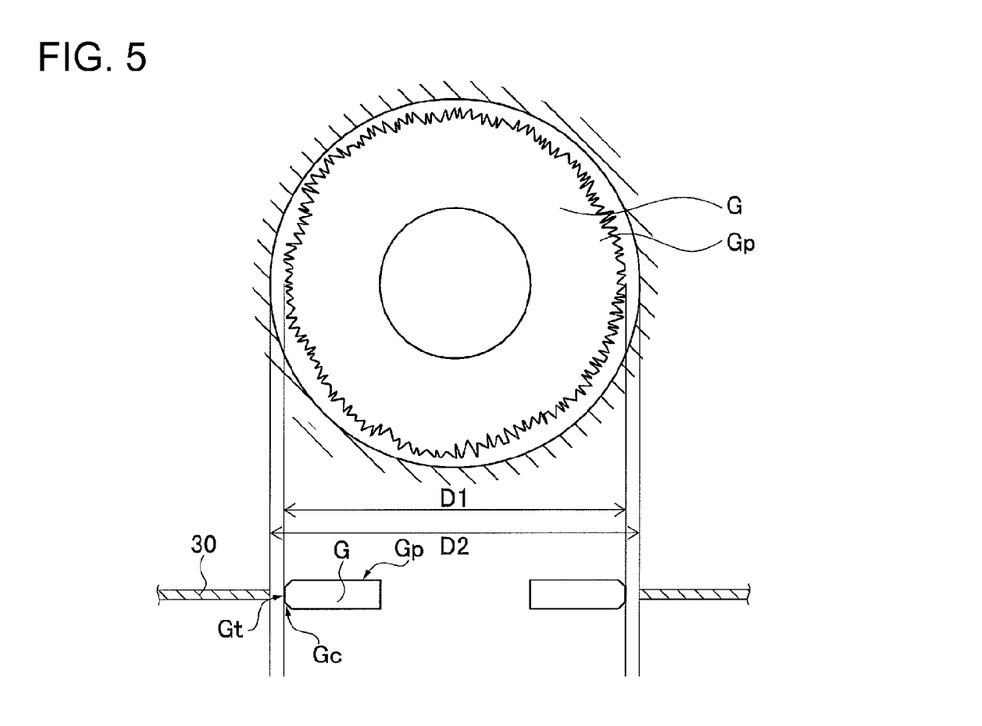
FIG. 5 is a diagram showing a state in which a carrier accommodates the glass substrate in main surface polishing processing.

However, in this embodiment, in the edge surface polishing processing, which is pre-processing, the outer circumferential edge surface has undergone brushing such that the deep unevenness is reduced, and therefore, even in the state in which the outer circumferential edge surface is pressed against the edge surface of the inner hole of the carrier 30 during the first polishing processing as shown in FIG. 5, the raised and recessed portions come into surface contact rather than point contact with the carrier. Therefore, the outer circumferential edge surface is unlikely to be damaged, and a small number of the raised portions of the outer circumferential edge surface are shaved off, thus suppressing the occurrence of foreign matter. It should be noted that the above-mentioned phenomenon can also occur in other processing using a carrier (precision grinding and second polishing).

It should be noted that as shown in FIG. 5, the outer circumferential edge surface of the glass substrate is damaged due to the outer circumferential edge surface being pressed against the edge surface of the inner hole of the carrier 30 during the main surface polishing, and therefore, the larger the outer diameter of the glass substrate is, the larger the area of the outer circumferential edge surface brought into contact with the carrier is (that is, as the outline becomes larger, the number of deep raised and recessed portions relatively increases), and thus a large amount of damage tends to occur. However, in the edge surface polishing processing, which is pre-processing, the outer circumferential edge surface of the glass substrate of this embodiment has undergone brushing such that the deep unevenness is reduced, the outer circumferential edge surface of the glass substrate having a large outer diameter is unlikely to be damaged. Therefore, it is preferable that a glass substrate has a larger outer diameter because an even better effect of the present invention can be exhibited. Although the method for manufacturing a magnetic-disk glass substrate having a nominal diameter of 2.5 inches (outer diameter of about 65 mm) is shown as an example in this embodiment, it is preferable to manufacture a magnetic-disk glass substrate having a larger outer diameter, such as a nominal diameter of 3 inches or 3.5 inches, than a glass substrate having a nominal diameter of 2.5 inches does because an even better effect of the present invention can be exhibited. Generally, the nominal diameter of 2.5 inches is a diameter of about 65 mm, for example, the nominal diameter of 3 inches is a diameter of about 84 mm, for example, and the nominal diameter of 3.5 inches is a diameter of about 95 mm, for example.

(6) Chemical Strengthening Processing

The glass substrate can be chemically strengthened as appropriate. A molten liquid obtained by heating potassium nitrate, sodium nitrate or a mixture thereof can be used as a chemical strengthening liquid, for example. By immersing the glass substrate in the chemical strengthening liquid, lithium ions and sodium ions in the surface layer of the glass substrate are respectively substituted with sodium ions and potassium ions having a relatively large ion radius in the chemical strengthening liquid, and thus a compressive stress layer is formed in the surface layer portion and the glass substrate is strengthened.

Although the timing at which the chemical strengthening processing is performed can be determined as appropriate, it is particularly preferable to perform polishing processing subsequent to the chemical strengthening processing because it is possible to make the surface smoother and to remove foreign matter that adheres to the surface of the glass substrate with the chemical strengthening processing. Moreover, it is sufficient to perform the chemical strengthening processing as needed, and alternatively, the chemical strengthening processing need not be performed.

(7) Second Polishing (Final Polishing) Processing

Next, second polishing is performed on the glass substrate, which has undergone the chemical strengthening processing. The second polishing is performed in order to mirror polish the main surfaces. Also in the second polishing, a double-side polishing device that has a configuration similar to that of the double-side polishing device used in the first polishing is used. In the second polishing processing, it is preferable to use loose abrasive particles having a smaller particle size than those used in the first polishing processing do and resin polishers having a smaller hardness than those used in the first polishing processing do. This makes it possible to make the surface roughness of the glass substrate extremely small.

Microparticles of colloidal silica or the like having an average particle diameter (D50) of about 10 to 50 nm, for example, are used as the loose abrasive particles to be used in the second polishing processing. Moreover, it is preferable to use suede-type soft polishers made of polyurethane foam as the polishing pads. In this case, it is preferable to set the hardness of the polishing pads to be in a range of 50 to 80 in Asker C hardness.

Although the second polishing processing is not necessarily essential, it is preferable to perform the second polishing processing because it is possible to make the level of surface unevenness of the main surfaces of the glass substrate more favorable. Thereafter, the glass substrate is cleaned as appropriate to provide a magnetic-disk glass substrate.

It should be noted that it is preferable to polish the glass substrate such that the surface roughness of the glass substrate, which has undergone the second polishing processing, is 0.15 nm or less at the arithmetic mean roughness Ra in order to produce a magnetic-disk glass substrate having a small surface roughness. The surface roughness can be calculated from a surface shape obtained by measuring an area of 1 μm square with a resolution of 256 by 256 pixels using an atomic force microscope (AFM).

It should be noted that when a magnetic-disk glass substrate constituted by crystallized glass is produced, crystallization processing is performed at an intermediate stage in the above-described series of processes. In the crystallization processing, glass substrates sandwiching a disc-shaped plate called a setter between each of them are introduced into a heating furnace and subjected to heating processing, for example. The setters can be made of ceramics. In the heating processing, the glass substrate is crystallized by adjusting as appropriate a nucleus forming temperature and a crystal growing temperature that is set subsequent to the nucleus forming temperature. It is preferable to adjust the nucleus forming temperature and the crystal growing temperature as appropriate depending on the glass composition of the glass substrate. When the glass substrate is cooled after being heated, it is preferable to adjust an annealing speed such that distortion and bending do not occur in the glass substrate.

A glass substrate made of crystallized glass has a smaller linear expansion coefficient than a conventional glass substrate made of amorphous glass does, and thus distortion and bending are unlikely to occur even when the heating processing is performed. Accordingly, the glass substrate of this embodiment can be favorably used as a magnetic disk glass substrate for energy assistance since bending due to heat is unlikely to occur even when a magnetic layer is formed by heating components of the magnetic layer to 700 to 800° C. to anneal the components, for example.

[Magnetic Disk]

A magnetic disk can be obtained as follows using the magnetic-disk glass substrate.

A magnetic disk has a configuration in which at least an adherent layer, a base layer, a magnetic layer (magnetic recording layer), a protecting layer and a lubricant layer are laminated on the main surface of the magnetic-disk glass substrate (referred to as merely "substrate" hereinafter) in this order from the main surface, for example.

For example, the substrate is introduced into a film deposition device that has been evacuated, and the layers from the adherent layer to the magnetic layer are sequentially formed on the main surface of the substrate in an Ar atmosphere by a DC magnetron sputtering method. CrTi can be used in the adherent layer, and CrRu can be used in the base layer, for example. A CoPt based alloy can be used in the magnetic layer, for example. Also, a CoPt-based alloy or a FePt-based alloy having an $L_{10}$ ordered structure is formed to be the magnetic layer for thermally assisted magnetic recording. After the film deposition as described above, by forming the protecting layer using $C_2H_4$ by a CVD method, for example, and subsequently performing nitriding processing that introduces nitrogen to the surface, a magnetic recording medium can be formed. Thereafter, by coating the protecting layer with perfluoropolyether (PFPE) by a dip coat method, the lubricant layer can be formed.

In addition, a soft magnetic layer (SUL), a seed layer, an intermediate layer and the like may be formed between the adherent layer and the magnetic recording layer by a known film deposition method such as a sputtering method (including a DC magnetron sputtering method, RF magnetron sputtering method, and the like) or a vapor deposition method.

The produced magnetic disk is preferably incorporated in a hard disk drive (HDD) serving as a magnetic recording and reproduction device together with a magnetic head equipped with a dynamic flying height (DFH) control mechanism.

WORKING EXAMPLES AND COMPARATIVE EXAMPLES

In order to confirm the effect of the magnetic-disk glass substrate according to this embodiment, 2.5-inch magnetic disks were produced using manufactured glass substrates and LUL endurance testing was performed to check whether or not problems such as head crash and thermal asperity occurred. The glass composition was that of the above-described amorphous aluminosilicate glass.

[Production of Disk-Shaped Glass Substrates of Working Examples and Comparative Examples]

Disk-shaped glass substrates of working examples and comparative examples were produced by performing each process of the above-described manufacturing method in the given order.

Here, the press molding method was used in molding of the raw glass plates in step (1). In the rough grinding, alumina-based loose abrasive particles were used.

In the shaping processing in step (2), chamfered surfaces were formed at the outer edge portion and the inner edge portion of the glass substrate using a diamond grindstone.

In the edge surface polishing in step (3), polishing was performed by moving the polishing brush (channel roll brush) shown in FIG. 3 and the glass substrate relative to each other while the polishing brush is pressed against the outer circumferential edge surface of the disk-shaped glass substrate. A polishing liquid including loose abrasive particles was supplied between the polishing brush and the edge surface of the glass substrate, and the edge surface polishing was performed. At this time, the different disk-shaped glass substrates of the working examples and comparative examples shown in Table 1 were produced by adjusting as appropriate the diameter and the length of the bristle material of the polishing brush, the lead angle θ (see FIG. 3) of the channel brush around a shaft, pressure with which the polishing brush was pressed against the outer circumferential edge surface of the glass substrate, and the like as described above. When a peak count value of an outline that has not undergone the low-pass filtering is referred to as PC1 and a peak count value of an outline that has undergone the 150 peaks/rotation low-pass filtering is referred to as PC2, the peak count ratio shown in Table 1 is a value of PC2/PC1. Moreover, in Table 1, the roundness is a value that was obtained after the edge surface polishing and calculated based on an outline that had undergone the 50 peaks/rotation low-pass filtering.

Next, the processing of steps (4) to (7) below was performed on the disk-shaped glass substrates of the working examples and comparative examples to produce magnetic-disk glass substrates.

In the precision grinding in step (4), grinding was performed using a grinding device in which fixed diamond abrasive particles were attached to the surfaces of surface plates.

In the first polishing in step (5), polishing was performed for 60 minutes using a polishing device provided with a planetary gear mechanism. Cerium oxide abrasive particles having an average particle diameter of 1 μm were used, and hard urethane pads were used as the polishing pads.

In the chemical strengthening in step (6), molten salts of potassium nitrate and sodium nitrate were used as a chemical strengthening liquid to perform the chemical strengthening.

The second polishing in step (7) was performed using a polishing device provided with a planetary gear mechanism in the same manner as in the first polishing. Suede-type polishing pads provided with soft polishers made of polyurethane foam as the polishers were used. Colloidal silica having an average particle diameter of 20 nm was used as the loose abrasive particles.

In Table 1, the disk-shaped glass substrates of the working examples and comparative examples were evaluated by observing the outer circumferential edge surfaces of one hundred magnetic-disk glass substrates produced using the disk-shaped glass substrates under an optical microscope and a laser microscope and counting the number of glass substrates in which deep damage (scratch) occurred. The number of glass substrates in which damage having a depth of 0.25 μm or more occurred was counted.

TABLE 1

|  | Roundness (μm) | Peak count ratio | Number of glass substrates with damaged outer circumferential edge surface |
|---|---|---|---|
| Comp. Ex. 1 | 2.6 | 0.758 | 96 |
| Comp. Ex. 2 | 1.4 | 0.652 | 40 |
| Comp. Ex. 3 | 0.9 | 0.280 | 8 |
| Comp. Ex. 4 | 1.8 | 0.189 | 3 |
| Comp. Ex. 5 | 1.3 | 0.223 | 4 |
| Work. Ex. 1 | 0.6 | 0.034 | 0 |

TABLE 1-continued

| | Roundness (μm) | Peak count ratio | Number of glass substrates with damaged outer circumferential edge surface |
|---|---|---|---|
| Work. Ex. 2 | 0.9 | 0.086 | 0 |
| Work. Ex. 3 | 0.4 | 0.157 | 0 |
| Work. Ex. 4 | 1.3 | 0.077 | 0 |
| Work. Ex. 5 | 1.3 | 0.195 | 0 |

It was confirmed from the results of the working examples shown in Table 1 that when the roundness of the outer circumferential edge surface, which had undergone the edge surface polishing, was 1.3 μm or less and the peak count ratio was 0.2 or less, the outer circumferential edge surface of the magnetic-disk glass substrate obtained through the subsequent main surface polishing processing was not damaged. That is, it is thought that when the roundness of the outer circumferential edge surface, which has undergone the edge surface polishing, is 1.3 μm or less and the peak count ratio is 0.2 or less, fine foreign matter constituted by glass components does not occur, resulting in no problems such as head crash and thermal asperity due to foreign matter constituted by glass components.

When the outer circumferential edge surfaces of the magnetic-disk glass substrates produced using the disk-shaped glass substrates of Working Examples 1 to 5 were observed in detail under a laser microscope, no damage and no foreign matter were detected. Moreover, the main surfaces of each magnetic-disk glass substrate had an arithmetic mean roughness Ra of 0.15 nm or less.

Next, magnetic disks were produced by laminating an adherent layer, a base layer, a magnetic layer (magnetic recording layer), a protecting layer, and a lubricant layer in this order on the main surfaces of the magnetic-disk glass substrates produced using the disk-shaped glass substrates of Working Examples 1 to 5. When the outer circumferential edge surfaces of the magnetic disks were observed in detail under a laser microscope, no damage and no foreign matter were detected. Furthermore, the produced magnetic disk was mounted in an HDD, and LUL endurance testing (600000 times) was performed. The LUL endurance testing is a test in which the head is moved back and forth (seek operation) between the ramp and an ID stopper without stopping the motion in a state in which the hard disk drive (HDD) including the magnetic disk is placed in a constant temperature and humidity chamber with a temperature of 70° C. and a humidity of 80%, and abnormalities such as dirt and abrasion of the head are checked after the test. As a result of the LUL endurance testing, the problems such as head crash and thermal asperity did not occur, and favorable results were obtained.

While the disk-shaped glass substrate, the magnetic-disk glass substrate, the method for manufacturing a magnetic-disk glass substrate, and the magnetic disk according to the present invention have been described in detail, the present invention is not limited to the above-described embodiment, and it will be appreciated that various improvements and modifications can be made without departing from the gist of the present invention.

The invention claimed is:

1. A disk-shaped glass substrate comprising:
a pair of main surfaces, the disk-shaped glass substrate being to be made into a magnetic-disk glass substrate, an outer circumference of the disk-shaped glass substrate having a roundness of 1.3 μm or less,
a first reference circle being obtained with a least squares method from a first outline corresponding to a shape of a lap around the outer circumference of the disk-shaped glass substrate, and the number of peaks of the first outline that project outward in a radial direction from the first reference circle being defined as a first peak count value,
a second reference circle being obtained with a least squares method from a second outline obtained by performing low-pass filtering using a period in which the number of peaks per lap is 150 as a cut-off value on the first outline, and the number of peaks of the second outline that project outward in a radial direction from the second reference circle being defined as a second peak count value, and
a ratio of the second peak count value to the first peak count value being from 0.034 to 0.2.

2. The disk-shaped glass substrate according to claim 1, wherein
a surface roughness of an outer circumferential edge surface is set such that an arithmetic mean roughness Ra is 0.02 μm or less.

3. The disk-shaped glass substrate according to claim 2, wherein
an outer diameter is larger than that of a 2.5-inch magnetic-disk glass substrate.

4. The disk-shaped glass substrate according to claim 3, further comprising
a side wall surface orthogonal to the main surfaces, and
a chamfered surface connecting one of the main surfaces and the side wall surface, the side wall surface and the chamfered surface being disposed at least at an edge surface of an outer circumferential side of the disk-shaped glass substrate, wherein
a surface roughness of one of the side wall surface and the chamfered surface is set such that an arithmetic mean roughness Ra is 0.02 μm or less.

5. The disk-shaped glass substrate according to claim 2, further comprising
a side wall surface orthogonal to the main surfaces, and
a chamfered surface connecting one of the main surfaces and the side wall surface, the side wall surface and the chamfered surface being disposed at least at an edge surface of an outer circumferential side of the disk-shaped glass substrate, wherein
a surface roughness of one of the side wall surface and the chamfered surface is set such that an arithmetic mean roughness Ra is 0.02 μm or less.

6. The disk-shaped glass substrate according to claim 1, wherein
an outer diameter is larger than that of a 2.5-inch magnetic-disk glass substrate.

7. The disk-shaped glass substrate according to claim 6, further comprising
a side wall surface orthogonal to the main surfaces, and
a chamfered surface connecting one of the main surfaces and the side wall surface, the side wall surface and the chamfered surface being disposed at least at an edge surface of an outer circumferential side of the disk-shaped glass substrate, wherein
a surface roughness of one of the side wall surface and the chamfered surface is set such that an arithmetic mean roughness Ra is 0.02 μm or less.

8. The disk-shaped glass substrate according to claim 1, further comprising
a side wall surface orthogonal to the main surfaces, and
a chamfered surface connecting one of the main surfaces and the side wall surface, the side wall surface and the chamfered surface being disposed at least at an edge surface of an outer circumferential side of the disk-shaped glass substrate, wherein
a surface roughness of one of the side wall surface and the chamfered surface is set such that an arithmetic mean roughness Ra is 0.02 µm or less.

9. A magnetic-disk glass substrate comprising:
a pair of main surfaces,
an outer circumference of the glass substrate having a roundness of 1.3 µm or less,
a first reference circle being obtained with a least squares method from a first outline corresponding to a shape of a lap around the outer circumference of the glass substrate, and the number of peaks of the first outline that project outward in a radial direction from the first reference circle being defined as a first peak count value,
a second reference circle being obtained with a least squares method from a second outline obtained by performing low-pass filtering using a period in which the number of peaks per lap is 150 as a cut-off value on the first outline, and the number of peaks of the second outline that project outward in a radial direction from the second reference circle being defined as a second peak count value,
a ratio of the second peak count value to the first peak count value being from 0.034 to 0.2, and
an arithmetic mean roughness Ra of the main surfaces being 0.15 nm or less.

10. A magnetic disk obtained by forming magnetic layers on the main surfaces of the magnetic-disk glass substrate according to claim 9.

11. The magnetic-disk glass substrate according to claim 9, further comprising
a side wall surface orthogonal to the main surfaces, and
a chamfered surface connecting one of the main surfaces and the side wall surface, the side wall surface and the chamfered surface being disposed at least at an edge surface of an outer circumferential side of the magnetic-disk glass substrate, wherein
a surface roughness of one of the side wall surface and the chamfered surface is set such that an arithmetic mean roughness Ra is 0.02 µm or less.

12. A method for manufacturing a magnetic-disk glass substrate comprising:
polishing an outer circumferential edge surface of a disk-shaped glass substrate using a polishing brush; and
polishing main surfaces of the glass substrate while the glass substrate with the polished outer circumferential edge surface is held with a carrier,
the polishing of the outer circumferential edge surface including polishing the outer circumferential edge surface such that
an outer circumference of the disk-shaped glass substrate has a roundness of 1.3 µm or less,
a first reference circle is obtained with a least squares method from a first outline corresponding to a shape of a lap around the outer circumference of the disk-shaped glass substrate, and the number of peaks of the first outline that project outward in a radial direction from the first reference circle is defined as a first peak count value,
a second reference circle is obtained with a least squares method from a second outline obtained by performing low-pass filtering using a period in which the number of peaks per lap is 150 as a cut-off value on the first outline, and the number of peaks of the second outline that project outward in a radial direction from the second reference circle is defined as a second peak count value, and
a ratio of the second peak count value to the first peak count value is from 0.034 to 0.2.

13. A magnetic-disk substrate comprising:
a pair of main surfaces,
an outer circumference of the magnetic-disk substrate having a roundness of 1.3 µm or less,
a first reference circle being obtained with a least squares method from a first outline corresponding to a shape of a lap around the outer circumference of the disk-shaped substrate, and the number of peaks of the first outline that project outward in a radial direction from the first reference circle being defined as a first peak count value,
a second reference circle being obtained with a least squares method from a second outline obtained by performing low-pass filtering using a period in which the number of peaks per lap is 150 as a cut-off value on the first outline, and the number of peaks of the second outline that project outward in a radial direction from the second reference circle being defined as a second peak count value,
a ratio of the second peak count value to the first peak count value being from 0.034 to 0.2, and
a surface roughness of an outer circumferential edge surface being set such that an arithmetic mean roughness Ra being 0.02 µm or less.

14. The magnetic-disk substrate according to claim 13, wherein
the outer circumferential edge surface of the magnetic-disk substrate includes a side wall surface, and a pair of chamfered surfaces interposed between the side wall surface and the main surfaces,
an arithmetic mean roughness Ra of the main surfaces being 0.15 nm or less, and
a surface roughness of the side wall surface or the pair of the chamfered surfaces is set such that an arithmetic mean roughness Ra is 0.02 µm or less.

15. A magnetic disk in which a magnetic layer is formed on the main surfaces of the magnetic-disk substrate according to claim 13.

16. A method for manufacturing a magnetic-disk substrate, the method comprising:
polishing main surfaces of a disk-shaped substrate while the disk-shaped substrate is held with a carrier,
an outer circumference of the disk-shaped substrate having a roundness of 1.3 µm or less,
a first reference circle being obtained with a least squares method from a first outline corresponding to a shape of a lap around the outer circumference of the disk-shaped substrate, and the number of peaks of the first outline that project outward in a radial direction from the first reference circle being defined as a first peak count value,
a second reference circle being obtained with a least squares method from a second outline obtained by performing low-pass filtering using a period in which the number of peaks per lap is 150 as a cut-off value on the first outline, and the number of peaks of the second outline that project outward in a radial direction from the second reference circle being defined as a second peak count value, and a ratio of the second peak count value to the first peak count value being from 0.034 to 0.2.

17. The method for manufacturing the magnetic-disk substrate according to claim 16, wherein the polishing of the main surface includes polishing the main surface by using loose abrasive particles including colloidal silica.

18. The method for manufacturing the magnetic-disk substrate according to claim 16, wherein the polishing of the main surface includes polishing the main surface such that an arithmetic mean roughness Ra of the main surface is 0.15 nm or less.

19. A method for manufacturing a disk-shaped substrate comprising:

polishing an outer circumferential edge surface of the disk-shaped substrate using a polishing brush, the disk-shaped substrate having a circular hole, the polishing of the outer circumferential edge surface including polishing the outer circumferential edge surface such that an outer circumference of the disk-shaped substrate has a roundness of 1.3 μm or less, a first reference circle is obtained with a least squares method from a first outline corresponding to a shape of a lap around the outer circumference of the disk-shaped substrate, and the number of peaks of the first outline that project outward in a radial direction from the first reference circle is defined as a first peak count value, a second reference circle is obtained with a least squares method from a second outline obtained by performing low-pass filtering using a period in which the number of peaks per lap is 150 as a cut-off value on the first outline, and the number of peaks of the second outline that project outward in a radial direction from the second reference circle is defined as a second peak count value, and a ratio of the second peak count value to the first peak count value is from 0.034 to 0.2.

20. The method for manufacturing the disk-shaped substrate according to claim 19, wherein at least the outer circumferential edge surface of the disk-shaped substrate that has the circular hole includes a side wall surface and a pair of chamfered surfaces interposed between the side wall surface and a pair of main surfaces, and the polishing of the outer circumferential edge surface includes polishing the outer circumferential edge surface such that a surface roughness of the side wall surface or the chamfered surface is set such that an arithmetic mean roughness Ra is 0.02 μm or less.

\* \* \* \* \*